United States Patent

Nogami et al.

Patent Number: 5,766,673
Date of Patent: Jun. 16, 1998

[54] PROCESS FOR FORMING A LIQUID CRYSTAL VERTICAL ALIGNMENT FILM

[75] Inventors: Tatsuya Nogami; Takakazu Nakada; Rie Sakai; Takeshi Hosoya, all of Funabashi, Japan

[73] Assignee: Nissan Chemical Industries, Ltd., Tokyo, Japan

[21] Appl. No.: 791,058

[22] Filed: Jan. 28, 1997

[30] Foreign Application Priority Data

Feb. 16, 1996  [JP]  Japan .................. 8-028962

[51] Int. Cl.$^6$ ........................................ B05D 5/12
[52] U.S. Cl. .............. 427/58; 106/287.1; 106/287.16; 106/287.23; 106/287.34; 427/387
[58] Field of Search ............ 427/58, 387; 106/287.1, 106/287.16, 287, 23, 287.34

[56] References Cited

U.S. PATENT DOCUMENTS

| | | | |
|---|---|---|---|
| 4,437,731 | 3/1984 | Sudo et al. | 350/340 |
| 4,472,027 | 9/1984 | Okubo et al. | 350/340 |
| 4,472,028 | 9/1984 | Ooue et al. | 350/341 |
| 5,091,009 | 2/1992 | Nogami et al. | 106/287.1 |
| 5,384,356 | 1/1995 | Nogami et al. | 524/726 |

FOREIGN PATENT DOCUMENTS

| | | |
|---|---|---|
| 57-42019 | 3/1982 | Japan . |
| 57-56819 | 4/1982 | Japan . |
| 61-117524 | 6/1986 | Japan . |

OTHER PUBLICATIONS

Database WPI, Derwent Publications, AN-86-185552, JP-61-117524, Jun. 4, 1986.
Patent Abstracts of Japan, vol. 6, No. 112 (P-124), Jun. 23, 1982, JP-57-042019, Mar. 9, 1982.

*Primary Examiner*—Bernard Pianalto
*Attorney, Agent, or Firm*—Oblon, Spivak, McClelland, Maier & Neustadt, P.C.

[57] ABSTRACT

A process for forming a liquid crystal vertical alignment film on an electrode substrate surface, which comprises preparing a reaction mixture comprising a silicon compound (A) of the following formula (1):

$$Si(OR)_4 \quad (1)$$

wherein R is a $C_{1-5}$ alkyl group, a silicon compound (B) of the following formula (2):

$$R^1Si(OR)_3 \quad (2)$$

wherein $R^1$ is an unsubstituted or fluorinated $C_{3-20}$ alkyl group, and R is as defined above, an alcohol (C) of the following formula (3):

$$R^2CH_2OH \quad (3)$$

wherein $R^2$ is a hydrogen atom, or an unsubstituted or substituted $C_{1-12}$ alkyl group, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B).

18 Claims, No Drawings

PROCESS FOR FORMING A LIQUID CRYSTAL VERTICAL ALIGNMENT FILM

The present invention relates to an improvement of a liquid crystal vertical alignment film formed on an electrode substrate in a liquid crystal display device from a polymer solution of an alkoxy group-containing silicon compound.

A usual liquid crystal display device comprises liquid crystal and a pair of electrode substrates facing each other with the liquid crystal interposed therebetween. As an effective method for vertically aligning liquid crystal molecules in the liquid crystal display device, a method of forming a coating film on an electrode substrate in the liquid display device has been known, and such a coating film is called a liquid crystal vertical alignment film. As improved liquid crystal vertical alignment films, some films have been proposed in which alkoxy group-containing silanes are used as starting materials.

JP-A-61-117524 discloses a liquid crystal vertical alignment film formed by coating an organometallic compound such as tetrabutoxytitanium on at least one of the pair of electrode substrate surfaces which are in contact with the liquid crystal layer, followed by heat-curing to form an undercoating film, then coating a monoalkyltrialkoxysilane such as octadecyltriethoxysilane on the undercoating film, followed by heat-curing to form a liquid crystal vertical alignment film. This publication further mentions that the liquid crystal vertical alignment film exhibits excellently reproducible vertical alignment, and the undercoating film serves to stabilize the liquid crystal vertical alignment film and to improve heat resistance and adhesion to the substrate.

JP-A-57-42019 discloses a method for forming a vertical alignment film, which comprises subjecting a silane having from 2 to 4 alkoxy groups such as tetraethoxysilane or dimethyldimethoxysilane to usual hydrolysis and condensation polymerization by means of e.g. an acid catalyst to form a silanol-containing oligomer, adding this oligomer and a silane containing a long-chain alkyl group and alkoxy groups such as octadecyltriethoxysilane in a ratio of from 0.17 to 10 mol per mol of the above alkoxy group-containing silane, to a solvent such as ethyl cellosolve, to obtain a coating fluid, coating this coating fluid on an electrode substrate and then heat-curing the coating at a temperature of from 100° to 250° C. to form a vertical alignment film. This publication also mentions that this coating fluid is excellent in the coating properties, the ability for alignment does not decrease in the heating step, and the alignment film thereby obtained has excellent properties for aligning various liquid crystals.

JP-A-57-56819 discloses a process for forming a vertical alignment film, which comprises reacting a carboxylic acid such as acetic acid or formic acid with a halogenated silane such as tetrachlorosilane to form silicon carboxylate, reacting the silicon carboxylate having unreacted acetic acid removed by e.g. distillation under reduced pressure, with an alcohol such as ethyl alcohol to form a silanol oligomer solution, then adding to this oligomer solution, an alkylsilane such as octadecyltriethoxysilane or perfluoroalkylsilane in a silicon atomic ratio of from 0.01 to 10, followed by a reaction at a temperature of from 20° to 80° C. to obtain a coating fluid, coating the coating fluid on the surface of an electrode substrate, and heat-curing the coating at a temperature of from 100° to 350° C. to form a vertical alignment film. This publication further mentions that this alignment film is capable of vertically aligning any type of liquid crystals, the alignment is stable, and the quality of display is high.

However, such improved vertical alignment films or methods for their formation are still inadequate.

In the formation of a vertical alignment film as disclosed in the above JP-A-61-117524, a step of forming an undercoating film made of a heat-cured product of an organometallic compound, is required, and it is necessary to carry out coating and heating twice. Further, with respect to the vertical alignment film thereby formed, it is difficult to obtain a film having a sufficient thickness, the film is likely to have pinholes, and the useful life of the film is relatively short.

By the method for forming a vertical alignment film as disclosed in the above JP-A-57-42019, it is possible to obtain a film having a sufficient thickness, and the film has no pinholes. However, it is poor in the durability of the properties for vertically aligning liquid crystal, and a step of hydrolysis and the subsequent mixing step are required for the preparation of the coating fluid to be used for the formation of this film. Thus, the method is not simple. Besides, the storage stability of the coating fluid is inadequate.

In the method for forming a vertical alignment film as disclosed in the above JP-A-57-56819, hydrogen chloride formed as a byproduct by the reaction of a chloride-containing material such as chlorosilane as the starting material, will remain in the liquid product even after the distillation under reduced pressure as mentioned above, and such hydrogen chloride is likely to bring about corrosion to metals in the surrounding and will be hazardous to the production of a liquid crystal display where high purity is especially required. Further, also in the preparation of the coating fluid, a multistage process is required. Thus, the method is not simple. Besides, the end point of the reaction is hardly ascertained, and it is difficult to prepare a coating fluid having a constant quality.

It is an object of the present invention to provide a process for forming simply and efficiently a liquid crystal vertical alignment film which is excellent in the property for vertically aligning liquid crystal on an electrode substrate of a liquid crystal display device, the reproducibility of such property, the heat resistance and the uniformity.

Another object of the present invention is to provide a coating fluid which is useful for forming such a liquid crystal vertical alignment film and which is stable as an industrial product, and a process for producing such a coating fluid efficiently.

The coating fluid useful for forming a liquid crystal vertical alignment film of the present invention comprises a polysiloxane solution obtained by preparing a reaction mixture comprising a silicon compound (A) of the following formula (1):

$$Si(OR)_4 \qquad (1)$$

wherein R is a $C_{1-5}$ alkyl group, a silicon compound (B) of the following formula (2):

$$R^1Si(OR)_3 \qquad (2)$$

wherein $R^1$ is an unsubstituted or fluorinated $C_{3-20}$ alkyl group, and R is as defined above, an alcohol (C) of the following formula (3):

$$R^2CH_2OH \qquad (3)$$

wherein $R^2$ is a hydrogen atom, or an unsubstituted or substituted $C_{1-12}$ alkyl group, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B); and heating this reaction mixture at a temperature of from 50° to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water.

The process for forming a liquid crystal vertical alignment film of the present invention, comprises coating the above coating fluid on an electrode substrate surface to form a coating and heat-curing the coating at a temperature of from 80° to 400° C. This liquid crystal vertical alignment film is formed as adhered on the electrode substrate surface.

The above polysiloxane solution is transparent and contains no polysiloxane of gel form. Although a large amount of the alcohol (C) and a relatively large amount of oxalic acid (D) are coexistent, since the silicon compounds (A) and (B) are heated in a reaction mixture in the absence of water, this polysiloxane is not the one formed by condensation of hydrolyzates of the silicon compounds (A) and (B). When a polysiloxane is formed from an alkoxysilane by a method of hydrolysis in an alcohol solvent, the liquid tends to be turbid, or a non-uniform polysiloxane is likely to form, as the hydrolysis proceeds. With the above reaction mixture of the present invention, no such phenomenon will take place.

The chemical structure of the polysiloxane of the present invention is complex and can not be specifically defined. However, it is considered that a co-condensate polysiloxane of the silicon compounds (A) and (B) having a degree of polymerization suitable for forming a solution and having a relatively uniform structure, will form, even though it may have a branched structure, as polymerization proceeds, probably as the alcohol (C) acts on an intermediate formed by the reaction of the silicon compounds (A) and (B) with oxalic acid (D).

By heating the coating containing the above polysiloxane solution, coated on the electrode substrate, removal of volatile components from the coating and a curing reaction of polysiloxane in the coating will proceed, whereby an insoluble coating film adhered to the substrate surface and having an excellent property for vertical alignment, will form.

Now, the present invention will be described in detail with reference to the preferred embodiments.

Examples of the alkyl group R in the above formulas (1) and (2) include methyl, ethyl, propyl, butyl and pentyl. Preferred examples of the silicon compound (A) include tetramethoxysilane, tetraethoxysilane, tetrapropoxysilane and tetrabutoxysilane. Among them, particularly preferred are tetramethoxysilane and tetraethoxysilane. These compounds may be used alone or in combination as a mixture of two or more of them.

Examples of the alkyl group $R^1$ in the above formula (2) include unsubstituted alkyl groups such as hexyl, heptyl, octyl, dodecyl, hexadecyl and octadecyl, and fluorinated alkyl groups such as trifluoropropyl, heptafluoropentyl, heptafluoroisopentyl, tridecafluorooctyl and heptadecafluorodecyl. Preferred examples of the silicon compound (B) include unsubstituted alkyltrialkoxysilanes such as hexyltrimethoxysilane, hexyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane and octadecyltriethoxysilane, fluorinated straight-chain alkyltrialkoxysilanes of the following formula (4):

$$CF_3(CF_2)_nCH_2CH_2Si(OR)_3 \qquad (4)$$

wherein n is an integer of from 0 to 17, and R is a $C_{1-5}$ alkyl group, such as trifluoropropyltrimethoxysilane, trifluoropropyltriethoxysilane, heptafluoropentyltrimethoxysilane, heptafluoropentyltriethoxysilane, tridecafluorooctyltrimethoxysilane, tridecafluorooctyltriethoxysilane, heptadecafluorodecyltrimethoxysilane and heptadecafluorodecyltriethoxysilane, and fluorinated branched-chain alkyltrialkoxysilanes such as heptafluoroisopentyltrimethoxysilane [$(CF_3)_2CFCH_2CH_2Si(OCH_3)_3$]. These silicon compounds may be used alone or in combination as a mixture of two or more of them.

Examples of the unsubstituted alkyl group $R^2$ in the above formula (3) include methyl, ethyl, propyl, butyl, pentyl, hexyl, heptyl and octyl. Examples of the substituted alkyl group $R^2$ includes hydroxymethyl, methoxymethyl, ethoxymethyl, hydroxyethyl, methoxyethyl and ethoxyethyl. Preferred examples of the alcohol (C) include methanol, ethanol, propanol, n-butanol, ethylene glycol monomethyl ether, ethylene glycol monoethyl ether, diethylene glycol monomethyl ether, diethylene glycol monoethyl ether, propylene glycol monomethyl ether and propylene glycol monoethyl ether. These silicon compounds may be used alone or in combination as a mixture of two or more of them. Among them, particularly preferred is ethanol.

A uniform polysiloxane solution is hardly obtainable from a reaction mixture in which the silicon compound (B) is used in an amount exceeding 0.43 mol per mol of the silicon compound (A). From a reaction mixture wherein the silicon compound (B) is used in an amount of less than 0.05 mol per mol of the silicon compound (A), a coating film showing a property for vertical alignment will hardly be formed. It is particularly preferred that the silicon compound (B) is used in an amount of from 0.05 to 0.25 mol per mol of the silicon compound (A).

If the alcohol (C) is used in an amount smaller than 0.5 mol per mol of the total alkoxy groups contained in the silicon compounds (A) and (B), it takes a long time to form the polysiloxane, and it tends to be difficult to form a coating film having high hardness from the liquid containing the polysiloxane thereby obtained. On the other hand, if the alcohol (C) is used in an amount larger than 100 mol per mol of the total alkoxy groups contained in the silicon compounds (A) and (B), the $SiO_2$ concentration in the obtained polysiloxane-containing liquid tends to be inadequate, and concentration will be required prior to coating, such being inefficient. It is particularly preferred to use the alcohol (C) in an amount of from 1 to 50 mol per mol of the total alkoxy groups contained in the silicon compounds (A) and (B).

If oxalic acid (D) is used in an amount smaller than 0.2 mol per mol of the total alkoxy groups contained in the silicon compounds (A) and (B), it tends to be difficult to form a coating film showing a property for vertical alignment, and the hardness of the formed film tends to be low. On the other hand, if the oxalic acid (D) is used in an amount larger than 2 mol per mol of the total alkoxy groups contained in the silicon compounds (A) and (B), the resulting polysiloxane-containing liquid contains a relatively large amount of the oxalic acid (D), and from such a liquid, it tends to be difficult to obtain a coating film having the desired properties. It is particularly preferred to use the oxalic acid (D) in an amount of from 0.25 to 1 mol per mol of the total alkoxy groups contained in the silicon compounds (A) and (B).

In the preparation of the polysiloxane solution, an alkoxysilane not used as the above silicon compounds (A) and (B), may be incorporated as a modifier in an amount of from about 2 to 20 mol per mol of the silicon compound (A), as the case requires, in addition to the above silicon compounds (A) and (B), alcohol (C) and oxalic acid (D). Preferred examples of such a modifier include trialkoxysilanes such as phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane and γ-methacryloxypropyltriethoxysilane, and dialkoxysilanes such as dimethyldimethoxysilane and dimethyldiethoxysilane. Such a modifier serves to lower the temperature for curing the coating on the electrode substrate and to improve the adhesion of the film to the electrode substrate.

The reaction mixture comprising the silicon compounds (A) and (B), the alcohol (C) and the oxalic acid (D), may be formed by mixing such components, or by further incorporating the above modifier thereto. To such a reaction mixture, no water may be added. This reaction mixture is preferably heated in the form of a solution. For example, it is preferably heated as a reaction mixture in the form of a solution obtained by preliminarily adding the oxalic acid (D) to the alcohol (C) to form an alcohol solution of oxalic acid and then mixing the silicon compounds (A) and (B) and the above modifier to the solution. The reaction mixture comprising the silicon compound (A), the silicon compound (B), the alcohol (C) and the oxalic acid (D) in the above-mentioned ratios, usually has a $SiO_2$ concentration of from 0.5 to 10 wt % when silicon atoms contained therein are calculated as $SiO_2$. Also in the case of the reaction mixture containing the above modifier, such a modifier is incorporated so that the mixture will have a $SiO_2$ concentration of from 0.5 to 10 wt % when silicon atoms contained therein are calculated as $SiO_2$. Such a reaction mixture is maintained at the above $SiO_2$ concentration and in the absence of water during the heating of the reaction mixture. This heating can be carried out in a usual reactor at a liquid temperature of from 50° to 180° C. Preferably, it is carried out, for example, in a closed container or under reflux, so that no evaporation or volatilization of the liquid from the reactor occurs.

If the heating to form the polysiloxane is carried out at a temperature lower than 50° C., the liquid tends to have turbidity or tends to contain insoluble substances. Therefore, this heating is carried out at a temperature higher than 50° C. If the temperature is high, the operation can be completed in a short period of time. However, heating at a temperature higher than 180° C. is inefficient, as no additional merits will be thereby obtained. The heating time is not particularly limited. For example, it is usually about 8 hours at 50° C. and about 3 hours under reflux at 78° C. Usually, the heating is terminated when the amount of the remaining silicon compounds (A) and (B) becomes at most 5 mol %, based on the total charged amount of the silicon compounds (A) and (B). If a polysiloxane-containing liquid in which these silicon compounds remain more than 5 mol % based on the total amount of the silicon compounds (A) and (B) charged, is coated on an electrode substrate surface and then the coating is heat-cured at a temperature of from 80° to 400° C., the resulting coating film tends to have pinholes, or it tends to be difficult to obtain a coating film having adequate hardness.

The polysiloxane solution obtained by the above heating, may be used directly as a coating fluid for the next coating step. However, if desired, it may be concentrated or diluted to obtain a solution useful as a coating fluid, or the solvent may be substituted by other solvent, to obtain a solution useful as a coating fluid. Otherwise, an optional additive may be added thereto to obtain a coating fluid. Examples of such an additive include solid inorganic fine particles such as colloidal fine particles, other metal salts and metal compounds. These additives are suitable for controlling the hardness, adhesion to the electrode substrate, refractive index, etc. of the film.

The coating fluid to be used in the coating step, is preferably a fluid which contains from 0.5 to 10 wt %, as calculated as $SiO_2$, of silicon atoms derived from the above polysiloxane transparent solution. If this $SiO_2$ concentration is less than 0.5%, the thickness of the coating film formed by one coating operation tends to be thin. If the concentration exceeds 10 wt %, the storage stability of such a coating fluid tends to be inadequate. It is particularly preferred that the $SiO_2$ concentration of this coating fluid is from 2 to 8 wt %.

The above polysiloxane solution can be coated on the electrode substrate by a conventional method such as a dipping method, a spin coating method, a brush coating method, a roll coating method or a flexo printing method.

The coating formed on the electrode substrate may directly be heat-cured. However, prior to such heat-curing, it may be dried at a temperature of from room temperature to 80° C., preferably from 50° to 80° C., and then heated at a temperature of from 80° to 400° C., preferably from 100° to 350° C. The time for this heating may be from 5 to 60 minutes for adequate heat-curing. If this heating temperature is lower than 80° C., the hardness, chemical resistance or the like of the resulting coating film tends to be inadequate. Heat curing at a temperature higher than 350° C., especially higher than 400° C., is not desirable, since the property for vertical alignment tends to be poor. Such heating can be carried out by a conventional method, for example, by using a hot plate, an oven or a belt furnace.

The thickness of the film after curing is adjusted usually within a range of from 100 to 2,000 Å. If the film thickness is thinner than 100 Å, pinholes are likely to form, and a liquid crystal device having such a film tends to have drawbacks such as a decrease in the stability of electrical conduction or defects in liquid crystal display. On the other hand, if it exceeds 2,000 Å, the uniformity of the film surface tends to be poor, or cracks tend to form in the film.

Now, the present invention will be described in further detail with reference to Examples. However, it should be understood that the present invention is by no means restricted to such specific Examples.

Polysiloxane solutions of Examples and Comparative Examples were prepared, and the stability of such solutions and the performance of the films obtained from such solutions, were tested.

EXAMPLE 1

52.8 g of ethanol was charged into a four-necked flask equipped with a reflux condenser, and 20.0 g of oxalic acid was gradually added to this ethanol with stirring, to prepare an ethanol solution of oxalic acid. Then, this solution was heated to its reflux temperature, and a mixture comprising 21.8 g of tetraethoxysilane and 4.9 g of octadecyltriethoxysilane, was dropwise added to this solution under reflux. After completion of the dropwise addition, heating was continued for 5 hours under reflux, followed by cooling, and 75 g of butyl cellosolve was added to obtain a polysiloxane solution (L-1) having a $SiO_2$ concentration of 4 wt %.

This solution was analyzed by gas chromatography, whereby no alkoxysilane monomer was detected.

EXAMPLE 2

52.3 g of ethanol was charged into a four-necked flask equipped with a reflux condenser, and 20.5 g of oxalic acid was gradually added to this ethanol with stirring, to prepare an ethanol solution of oxalic acid. Then, this solution was heated to its reflux temperature, and a mixture comprising 21.8 g of tetraethoxysilane and 5.5 g of tridecafluorooctyltrimethoxysilane $[CF_3(CF_2)_5CH_2CH_2Si(OCH_3)_3]$, was dropwise added to this solution under reflux. After completion of the dropwise addition, heating was continued for 5 hours under reflux, followed by cooling, and 75 g of butyl cellosolve was added to obtain a polysiloxane solution (L-2) having a $SiO_2$ concentration of 4 wt %. This solution was analyzed by gas chromatography, whereby no alkoxysilane monomer was detected.

EXAMPLE 3

52.6 g of ethanol was charged into a four-necked flask equipped with a reflux condenser, and 20.5 g of oxalic acid was gradually added to this ethanol with stirring, to prepare an ethanol solution of oxalic acid. Then, this solution was heated to its reflux temperature, and a mixture comprising 21.8 g of tetraethoxysilane, 2.7 g of tridecafluorooctyltrimethoxysilane $[CF_3(CF_2)_5CH_2CH_2Si(OCH_3)_3]$ and 2.5 g of octadecyltriethoxysilane, was dropwise added to this solution under reflux. After completion of the dropwise addition, heating was continued for 5 hours under reflux, followed by cooling, and 75 g of butyl cellosolve was added to obtain a polysiloxane solution (L-3) having a $SiO_2$ concentration of 4 wt %. This solution was analyzed by gas chromatography, whereby no alkoxysilane monomer was detected.

EXAMPLE 4

49.7 g of ethanol was charged into a four-necked flask equipped with a reflux condenser, and 20.0 g of oxalic acid was gradually added to this ethanol with stirring, to prepare an ethanol solution of oxalic acid. Then, this solution was heated to its reflux temperature, and a mixture comprising 19.4 g of tetraethoxysilane and 10.9 g of tridecafluorooctyltrimethoxysilane $[CF_3(CF_2)_5CH_2CH_2Si(OCH_3)_3]$, was dropwise added to this solution under reflux. After completion of the dropwise addition, heating was continued for 5 hours under reflux, followed by cooling, and 75 g of butyl cellosolve was added to obtain a polysiloxane solution (L-4) having a $SiO_2$ concentration of 4 wt %.

This solution was analyzed by gas chromatography, whereby no alkoxysilane monomer was detected.

COMPARATIVE EXAMPLE 1

Into a four-necked flask equipped with a reflux condenser, 64.9 g of ethanol, 21.8 g of tetraethoxysilane and 5.6 g of tridecafluorooctyltrimethoxysilane $[CF_3(CF_2)_5CH_2CH_2Si(OCH_3)_3]$ were added and uniformly mixed. Then, 7.6 g of water and 0.1 g of nitric acid as a catalyst were added to this solution, followed by stirring and mixing for 30 minutes. Then, 75 g of butyl cellosolve was added thereto to obtain a polysiloxane solution (L-5) having a $SiO_2$ concentration of 4 wt %.

COMPARATIVE EXAMPLE 2

Into a four-necked flask equipped with a reflux condenser, 65.5 g of ethanol, 21.8 g of tetraethoxysilane and 5.0 g of octadecyltriethoxysilane were added and uniformly mixed. Then, 7.6 g of water and 0.1 g of nitric acid as a catalyst were added to this solution, followed by stirring and mixing for 30 minutes. Then, 75 g of butyl cellosolve was added thereto to obtain a polysiloxane solution (L-6) having a $SiO_2$ concentration of 4 wt %.

COMPARATIVE EXAMPLE 3

Into a four-necked flask equipped with a reflux condenser, 62.7 g of ethanol, 19.4 g of tetraethoxysilane and 10.9 g of tridecafluorooctyltrimethoxysilane $[CF_3(CF_2)_5CH_2CH_2Si(OCH_3)_3]$ were added and uniformly mixed. Then, 6.9 g of water and 0.1 g of nitric acid as a catalyst were added to this solution, followed by stirring and mixing for 30 minutes. Then, 75 g of butyl cellosolve was added thereto to obtain a polysiloxane solution (L-7) having a $SiO_2$ concentration of 4 wt %.

COMPARATIVE EXAMPLE 4

Into a four-necked flask equipped with a reflux condenser, 62.7 g of ethanol and 19.4 g of tetraethoxysilane were charged and mixed with stirring. Then, 6.9 g of water and 0.1 g of nitric acid as a catalyst were added to this solution, followed by stirring and mixing for 30 minutes. Then, 10.9 g of tridecafluorooctyltrimethoxysilane $[CF_3(CF_2)_5CH_2CH_2Si(OCH_3)_3]$ was added thereto and uniformly mixed. Then, 75 g of butyl cellosolve was added thereto to obtain a polysiloxane solution (L-8) having a $SiO_2$ concentration of 4 wt %.

EXAMPLE 5

The polysiloxane solutions (L-1) to (L-8) were left to stand at 25° C. for 3 months under a sealed condition in glass containers. During this period, the presence or absence of turbidity or precipitation formed in these solutions, was observed, and the results are shown in Table 1. In Table 1, symbol ○ indicates that no change was observed upon expiration of 3 months of the above storage, symbol Δ indicates that turbidity was observed upon expiration of one month of the above storage, and symbol X indicates that the turbidity was observed within 2 weeks of the above storage. In the solution (L-6), white precipitates were observed in 7 days, in the solution (L-7) the turbidity was observed during the preparation of the solution, and in the solution (L-8), turbidity was observed in 7 days. In Table 1, the molar ratio of the silicon compound (B) to the silicon compound (A) used for the preparation of the solution, is also shown.

TABLE 1

| Solution | Molar ratio | Stability | Film-forming property |
|---|---|---|---|
| L-1 | 0.11 | ○ | ○ |
| L-2 | 0.11 | ○ | ○ |
| L-3 | 0.11 | ○ | ○ |
| L-4 | 0.25 | ○ | ○ |
| L-5 | 0.11 | Δ | ○ |
| L-6 | 0.11 | x | Δ |
| L-7 | 0.25 | x | x |
| L-8 | 0.25 | x | Δ |

The results shown in Table 1 indicate that all of the polysiloxane solutions of the Examples are good, whereas the polysiloxane solutions (L-5) and (L-6) prepared by hydrolysis of the Comparative Examples are poor in the stability.

EXAMPLE 6

One of the polysiloxane solutions (L-1) to (L-8) was coated by a spin coater on a glass sheet of an electrode substrate comprising an electrically conducting material of indium-tin oxide (ITO) and the glass sheet covering the conductive material, followed by drying at 80° C., to form a coating film on the glass sheet, whereupon the surface of the coating film was inspected to test the film-forming property of such a solution. The results are shown in Table 1. In Table 1, symbol ○ indicates that the coating film is uniform, symbol Δ indicates that pinholes were partially observed in the coating film, and symbol X indicates that cissing was observed in the coating film. The results shown in Table 1 indicate that the polysiloxane solutions (L-6) to (L-8) of the Comparative Examples not only have no adequate stability but also have no adequate film-forming properties.

EXAMPLE 7

After the test in Example 6, the coating film was heated for 60 minutes at the temperature as shown in Table 2 to form a heat-cured film on the electrode substrate.

Then, a pair of the electrode substrates were bonded with a spacer of 50 μm interposed therebetween so that the sides having the above-mentioned heat-cured films were located inside, to form an internal void space. Then, into the internal void space, liquid crystal ZLI-4792 (tradename, manufactured by E. Merck) was injected, followed by sealing to obtain a liquid crystal display cell.

The prepared cell was observed by a polarization microscope in a crossed Nicols state to inspect the isogyre state in the microscopic visual field to test the property for vertically aligning liquid crystal. Further, such a property for vertical alignment was tested in the same manner also after applying heat treatment at 100° C. for 10 minutes to the cell.

Separately, a polarizing plate was bonded to the cell prepared in the same manner as described above, and the state of the transmitted light through the cell was visually inspected to test the property for aligning liquid crystal. This property for alignment was tested in the same manner also after application of heat treatment at 100° C. for 10 minutes.

The results of these tests are shown in Table 2. In Table 2, with respect to the property for vertical alignment, symbol ○ indicates that a clear isogyre was observed, and the liquid crystal of the cell exhibits an excellent property for vertical alignment, symbol Δ indicates that displacement of the center of the isogyre was observed, and the liquid crystal of the cell exhibits a slightly weak property for vertical alignment, and symbol X indicates that no isogyre was observed, and the liquid crystal of the cell shows no property for vertical alignment. Further, in Table 2, with respect to the property for alignment, symbol ○ indicates that the liquid crystal of the cell shows uniform alignment, symbol Δ indicates that the liquid crystal of the cell shows slightly non-uniform alignment, and symbol X indicates that the liquid crystal of the cell shows no alignment.

TABLE 2

| Solution used | Heat-curing temperature (°C.) | Property for vertical alignment | | Alignment | |
|---|---|---|---|---|---|
| | | Before heat treatment | After heat treatment | Before heat treatment | After heat treatment |
| L-1 | 180 | ○ | ○ | ○ | ○ |
| L-1 | 300 | ○ | ○ | ○ | ○ |
| L-1 | 450 | Δ | Δ | ○ | ○ |
| L-2 | 180 | ○ | ○ | ○ | ○ |
| L-3 | 180 | ○ | ○ | ○ | ○ |
| L-4 | 180 | ○ | ○ | ○ | ○ |
| L-5 | 180 | X | X | X | X |
| L-6 | 180 | ○ | Δ | Δ | X |
| L-7 | 180 | Δ | Δ | X | X |
| L-8 | 180 | ○ | ○ | Δ | Δ |

The results shown in Table 2 indicate that even when the solution (L-1) of the Example of the present invention is used, if the heat-cured film is formed at a temperature of 450° C., the property for liquid crystal vertical alignment of this film is inadequate. Further, they indicate that the polysiloxane solutions (L-5) to (L-8) of the Comparative Examples are inadequate also with respect to the property for vertical alignment and the alignment.

According to the present invention, the coating fluid can be efficiently prepared simply by mixing the starting materials and carrying out heat treatment only once, and this coating fluid is stable for more than 3 months, preferably more than 6 months, at room temperature and thus can be supplied as an industrial product.

This coating fluid can be applied to conventional electrode substrates. And, it is possible to form a liquid crystal vertical alignment film on an electrode substrate simply by coating such a coating fluid on an electrode substrate, followed by heat-curing, if necessary, after drying.

The liquid crystal alignment film of the present invention shows an excellent property for liquid crystal vertical alignment and excellent uniformity of the alignment, and it further has durability whereby its performance will not deteriorate even when it is heated. Further, by applying so-called rubbing treatment with a cloth made of nylon, cotton or rayon, as the case requires, on the surface of the alignment film thus formed, it is possible to form a film having a further improved property for vertical alignment.

The liquid crystal alignment film of the present invention is effectively useful for various conventional liquid crystals. The coating fluid of the present invention can be used for various conventional methods for producing liquid crystal display cells.

What is claimed is:

1. A process for forming a liquid crystal vertical alignment film on an electrode substrate surface, which comprises preparing a reaction mixture comprising a silicon compound (A) of the following formula (1):

$$Si(OR)_4 \qquad (1)$$

wherein R is a $C_{1-5}$ alkyl group, a silicon compound (B) of the following formula (2):

$$R^1Si(OR)_3 \qquad (2)$$

wherein $R^1$ is an unsubstituted or fluorinated $C_{3-20}$ alkyl group, and R is as defined above, an alcohol (C) of the following formula (3):

$R^2CH_2OH$ (3)

wherein $R^2$ is a hydrogen atom, or an unsubstituted or substituted $C_{1-12}$ alkyl group, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B); heating this reaction mixture at a temperature of from 50° to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water, to form a polysiloxane solution; then coating a coating fluid comprising the polysiloxane solution on an electrode substrate surface to form a coating; and heat-curing the coating at a temperature of from 80° to 400° C. to form a liquid crystal vertical alignment film, as adhered on the electrode substrate surface.

2. The process according to claim 1, wherein the silicon compound (A) is at least one silicon compound selected from the group consisting of tetramethoxysilane, tetraethoxysilane, tetrapropoxysilane and tetrabutoxysilane.

3. The process according to claim 1, wherein the silicon compound (A) is at least one silicon compound selected from the group consisting of tetramethoxysilane and tetraethoxysilane.

4. The process according to claim 1, wherein the silicon compound (B) is at least one silicon compound selected from the group consisting of hexyltrimethoxysilane, hexyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, trifluoropropyltrimethoxysilane, trifluoropropyltriethoxysilane, heptafluoropentyltrimethoxysilane, heptafluoropentyltriethoxysilane, tridecafluorooctylmethoxysilane, tridecafluorooctyltriethoxysilane, heptadecafluorodecyltrimethoxysilane, heptadecafluorodecyltriethoxysilane and heptafluoroisopentyltrimethoxysilane.

5. The process according to claim 1, wherein the alcohol (C) is at least one alcohol selected from the group consisting of methanol, ethanol, propanol, n-butanol, ethylene glycol monomethyl ether, ethylene glycol monoethyl ether, diethylene glycol monomethyl ether, diethylene glycol monoethyl ether, propylene glycol monomethyl ether and propylene glycol monoethyl ether.

6. The process according to claim 1, wherein the alcohol (C) is ethanol.

7. A coating fluid for forming a liquid crystal vertical alignment film on an electrode substrate surface, which comprises a polysiloxane solution obtained by preparing a reaction mixture comprising a silicon compound (A) of the following formula (1):

$Si(OR)_4$ (1)

wherein R is a $C_{1-5}$ alkyl group, a silicon compound (B) of the following formula (2):

$R^1Si(OR)_3$ (2)

wherein $R^1$ is an unsubstituted or fluorinated $C_{3-20}$ alkyl group, and R is as defined above, an alcohol (C) of the following formula (3):

$R^2CH_2OH$ (3)

wherein $R^2$ is a hydrogen atom, or an unsubstituted or substituted $C_{1-12}$ alkyl group, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B); and heating this reaction mixture at a temperature of from 50° to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water.

8. The coating fluid according to claim 7, wherein the silicon compound (A) is at least one silicon compound selected from the group consisting of tetramethoxysilane, tetraethoxysilane, tetrapropoxysilane and tetrabutoxysilane.

9. The coating fluid according to claim 7, wherein the silicon compound (A) is at least one silicon compound selected from the group consisting of tetramethoxysilane and tetraethoxysilane.

10. The coating fluid according to claim 7, wherein the silicon compound (B) is at least one silicon compound selected from the group consisting of hexyltrimethoxysilane, hexyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, trifluoropropyltrimethoxysilane, trifluoropropyltriethoxysilane, heptafluoropentyltrimethoxysilane, heptafluoropentyltriethoxysilane, tridecafluorooctylmethoxysilane, tridecafluorooctyltriethoxysilane, heptadecafluorodecyltrimethoxysilane, heptadecafluorodecyltriethoxysilane and heptafluoroisopentyltrimethoxysilane.

11. The coating fluid according to claim 7, wherein the alcohol (C) is at least one alcohol selected from the group consisting of methanol, ethanol, propanol, n-butanol, ethylene glycol monomethyl ether, ethylene glycol monoethyl ether, diethylene glycol monomethyl ether, diethylene glycol monoethyl ether, propylene glycol monomethyl ether and propylene glycol monoethyl ether.

12. The coating fluid according to claim 7, wherein the alcohol (C) is ethanol.

13. A process for preparing a coating fluid for forming a liquid crystal vertical alignment film on an electrode substrate surface, which comprises preparing a reaction mixture comprising a silicon compound (A) of the following formula (1):

$Si(OR)_4$ (1)

wherein R is a $C_{1-5}$ alkyl group, a silicon compound (B) of the following formula (2):

$R^1Si(OR)_3$ (2)

wherein $R^1$ is an unsubstituted or fluorinated $C_{3-20}$ alkyl group, and R is as defined above, an alcohol (C) of the following formula (3):

$R^2CH_2OH$ (3)

wherein $R^2$ is a hydrogen atom, or an unsubstituted or substituted $C_{1-12}$ alkyl group, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B); and heating this reaction mixture at a temperature of from 50° to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water.

14. The process according to claim 13, wherein the silicon compound (A) is at least one silicon compound selected from the group consisting of tetramethoxysilane, tetraethoxysilane, tetrapropoxysilane and tetrabutoxysilane.

15. The process according to claim 13, wherein the silicon compound (A) is at least one silicon compound selected from the group consisting of tetramethoxysilane and tetraethoxysilane.

16. The process according to claim 13, wherein the silicon compound (B) is at least one silicon compound selected from the group consisting of hexyltrimethoxysilane, hexyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, trifluoropropyltrimethoxysilane, trifluoropropyltriethoxysilane, heptafluoropentyltrimethoxysilane, heptafluoropentyltriethoxysilane, tridecafluorooctylmethoxysilane, tridecafluorooctyltriethoxysilane, heptadecafluorodecyltrimethoxysilane, heptadecafluorodecyltriethoxysilane and heptafluoroisopentyltrimethoxysilane.

17. The process according to claim 13, wherein the alcohol (C) is at least one alcohol selected from the group consisting of methanol, ethanol, propanol, n-butanol, ethylene glycol monomethyl ether, ethylene glycol monoethyl ether, diethylene glycol monomethyl ether, diethylene glycol monoethyl ether, propylene glycol monomethyl ether and propylene glycol monoethyl ether.

18. The process according to claim 13, wherein the alcohol (C) is ethanol.

* * * * *